United States Patent [19]
DeGroot

[11] Patent Number: 5,210,591
[45] Date of Patent: May 11, 1993

[54] INTERFEROMETRIC BALL BEARING TEST STATION

[75] Inventor: Peter J. DeGroot, Seattle, Wash.

[73] Assignee: Hughes Aircraft Company, Los Angeles, Calif.

[21] Appl. No.: 739,628

[22] Filed: Aug. 2, 1991

[51] Int. Cl.⁵ .............................................. G01B 9/02
[52] U.S. Cl. .................................. 356/357; 356/359
[58] Field of Search ............. 356/357, 359, 360, 345, 356/355

[56] References Cited

U.S. PATENT DOCUMENTS

| | | | |
|---|---|---|---|
| 3,749,500 | 7/1973 | Carlson et al. | 356/357 |
| 3,812,376 | 5/1974 | Takeyama et al. | 356/357 |
| 3,825,349 | 7/1974 | Nomarski | 356/361 |
| 4,131,365 | 12/1978 | Pryor | 356/358 |
| 4,917,498 | 4/1990 | Geary | 356/357 |

*Primary Examiner*—Samuel A. Turner
*Attorney, Agent, or Firm*—Wanda K. Denson-Low; Michael W. Sales; Robert A. Hays

[57] ABSTRACT

Method and apparatus for determining if a surface of an object, such as a ball bearing (12), has a radius of curvature within a predetermined tolerance. A test system (10) includes an interferometer having a reference beam (20a) and a measurement beam (20b). The measurement beam is disposed for illuminating a surface of the object while the object is in motion. A cylindrical lens (24) is provided for forming the measurement beam into a linear, stripe-like pattern that illuminates the surface. The measurement beam reflects from the surface of the object to a beamsplitter (20) that combines the reflected measurement beam with a reflected reference beam. The test system further includes an imager (30), optically coupled to an output of the interferometer, for recording a two dimensional interferogram that results from a change in an optical path length of the measurement beam relative to an optical path length of the reference beam. The test system further includes a processor (32), coupled to an output of the imager, for comparing the interferogram recorded by the imager to a reference interferogram previously recorded from a surface of an object known to have a radius of curvature within the predetermined tolerance.

20 Claims, 2 Drawing Sheets

INTERFEROMETRIC BALL BEARING TEST STATION

FIELD OF THE INVENTION

This invention relates generally to optical metrology apparatus and method and, in particular, to method and apparatus for determining a roundness of an object, in particular a ball bearing.

BACKGROUND OF THE INVENTION

Conventional practice for testing or inspecting the roundness of ball bearings includes mechanical sorting gauges and stylus profiling. Conventional practice also includes the use of optical inspection systems, in particular optical imaging systems.

However, these conventional techniques all suffer from problems relating to a significant amount of time required to inspect a given piece, inaccuracy, a requirement that a production line be interrupted to accomplish the inspection, and/or that only spot checking of a manufactured lot be accomplished.

Visible-wavelength interferometers are widely employed for high precision displacement measurement and surface profilometry. These interferometers generally include either single wavelength or dual wavelength optical sources.

As described in U.S. Pat. No. 4,832,489, issued May 23, 1989, to J. C. Wyant et al., a two-wavelength phase-shifting interferometer employs two laser sources for reconstructing steep surface profiles, such as aspheric surfaces. A 256×256 detector array is used and the technique computes an equivalent phas independently for each detector.

In an article entitled "Contouring Aspheri Surfaces Using Two-Wavelength Phase-Shifting Interferometry" by K. Creath, Y. Cheng, and J. Wyant, Optica Acta, 1985, Vol. 32, No. 12, 1455-1464 there is described two-wavelength holography using an argon-ion laser and a He-Ne laser. An uncoated aspheric surface was placed in one arm of an interferometer and two synthetic wavelengths were employed to generate interferograms that were recorded using a 100×100 diode array.

In an article entitled "Two-wavelength scanning spot interferometer using single-frequency diode lasers" by A. J. de Boef, Appl. Opt., Vol. 27, No. 2, Jan. 15, 1988 (306-311) there is described the use of two single frequency laser diodes to measure the profile of a rough surface. The inner surface of a spherically shaped aluminum bowl was measured by this technique and the results of the measurement were graphically compared to results obtained from a mechanical profilometer.

In an article entitled "Two-Wavelength Speckle Interferometry on Rough Surfaces Using a Mode Hopping Diode Laser" by A. Fercher, U. Vry and W. Werner, Optics and Lasers in Engineering 11, (1989) pages 271-279 there is described a time-multiplexed two-wavelength source consisting of a single mode diode that is switched between two adjacent oscillation modes.

The use of interferometry has also been extended to the testing of bearing surfaces as indicated in the following two articles.

In an article entitled "Interferometer for Measuring the Surface Shape of a Ball Bearing Raceway" by K. Nunome, M. Tsukamoto, T. Yatagai, and H. Saito, Applied Optics, 15 Nov. 1984, Vol. 24, No. 22, pp. 3791-3796 there is described an interferometric measuring technique developed to make precise measurements of periphery surface shapes, such as toroidal surfaces and raceway surfaces of bearings. The measuring apparatus consists of a Fizeau interferometer, a rotating air spindle unit, and a microcomputer system. The raceway shape along the cross section is measured at each rotating angle until the entire surface data are stored in the computer memory. The fringe data at each angle are displayed two dimensionally using a TV frame memory to obtain a peri-interferogram.

In an article entitled "Use of a Laser Interferometric Displacement-Measuring System for Noncontact Positioning of a Sphere on a Rotation Axis Through its Center and for Measuring the Spherical Contour", by P. E. Klingsporn, Applied Optics, 15 Aug. 1979, Vol. 18, No. 16, pp. 2881-2890, there is described a technique in which a laser interferometric displacement-measuring system is used for nonmechanical contact positioning of a highly reflective sphere on a rotation axis through its center and for measuring the degree of sphericity or roundness of the sphere. In one arrangement a parallel laser beam is focused to a virtual point at the center of the sphere, and in another arrangement the beam is focused at the spherical surface. It is shown on the basis of theory, and verified experimentally, that focusing the beam on the surface of the sphere is the more satisfactory arrangement. The technique was used to measure the roundness of spheres.

An optical technique that does not employ interferometry is shown in an article entitled "Optical Scanner for Ball Bearing Inspection" by R. W. Lewis, Optical Engineering, January/February 1982, Vol. 21, No. 1, pp. 113-117. This article describes a scanner that employs a fixed semicircular array of light sources to illuminate a rotating ball and an adjacent fixed array of light detectors to detect deviations from specularity on the ball surface. Each detector signal is processed by a separate channel of threshold detection electronics. The technique is said to enable inspection of balls spinning on tapered sizing railings.

However, what is not taught by this prior art, and what is thus one object of the invention to provide, is a single wavelength or multiple wavelength interferometer employed for determining a roundness of a spherical body while the body is in rolling motion through a test station, wherein a linear light pattern is projected upon a surface of the rolling body for generating a interferogram that is swept across a surface of a light sensitive detector element.

It is a further object of the invention to provide an interferometric technique employed for determining a roundness of a rotating ball bearing, the interferometer including a cylindrical lens to project a linear light pattern upon a surface of the rolling bearing.

It is another object of the invention to provide a test station for testing the roundness of a ball bearing, the test station operating in a rapid and accurate manner and further being readily integrable with a production line facility.

SUMMARY OF THE INVENTION

The foregoing and other problems are overcome and the objects of the invention are realized by method and apparatus for determining if a surface of an object has a radius of curvature within a predetermined tolerance. In accordance with an embodiment of the invention a test system includes an interferometer having a reference beam and a measurement beam. The measurement beam is disposed for illuminating a surface of the object while the object is in rolling motion. A cylindrical lens is provided for forming the measurement beam into a linear, stripe-like pattern that intersects the geometric center of the ball. An imaginary line traced out by the center of the ball as it rolls on a track coincides with the linear pattern at the focus of the cylindrical lens. The measurement beam reflects, from the surface of the object, to a beamsplitter that combines the reflected measurement beam with a reflected reference beam. The test system further includes apparatus, such as a Charge Coupled Device (CCD) imager, optically coupled to an output of the interferometer for recording a two dimensional interferogram from a substantially one dimensional interferogram that is scanned across the imager during a forward motion of the object. The interferogram results from a change in an optical path length of the measurement beam, relative to an optical path length of the reference beam. The movement of the ball within the measurement beam produces a two dimensional interferogram representative of the surface contours of the ball. The test system further includes a processor, coupled to an output of the imager, for comparing the interferogram recorded by the imager to a reference interferogram previously recorded from a surface of an object known to have a radius of curvature and surface uniformity within the predetermined tolerances.

BRIEF DESCRIPTION OF THE DRAWING

The above set forth and other features of the invention are made more apparent in the ensuing detailed description of the invention when read in conjunction with the attached drawing, wherein.

DETAILED DESCRIPTION OF THE INVENTION

Figure 1:
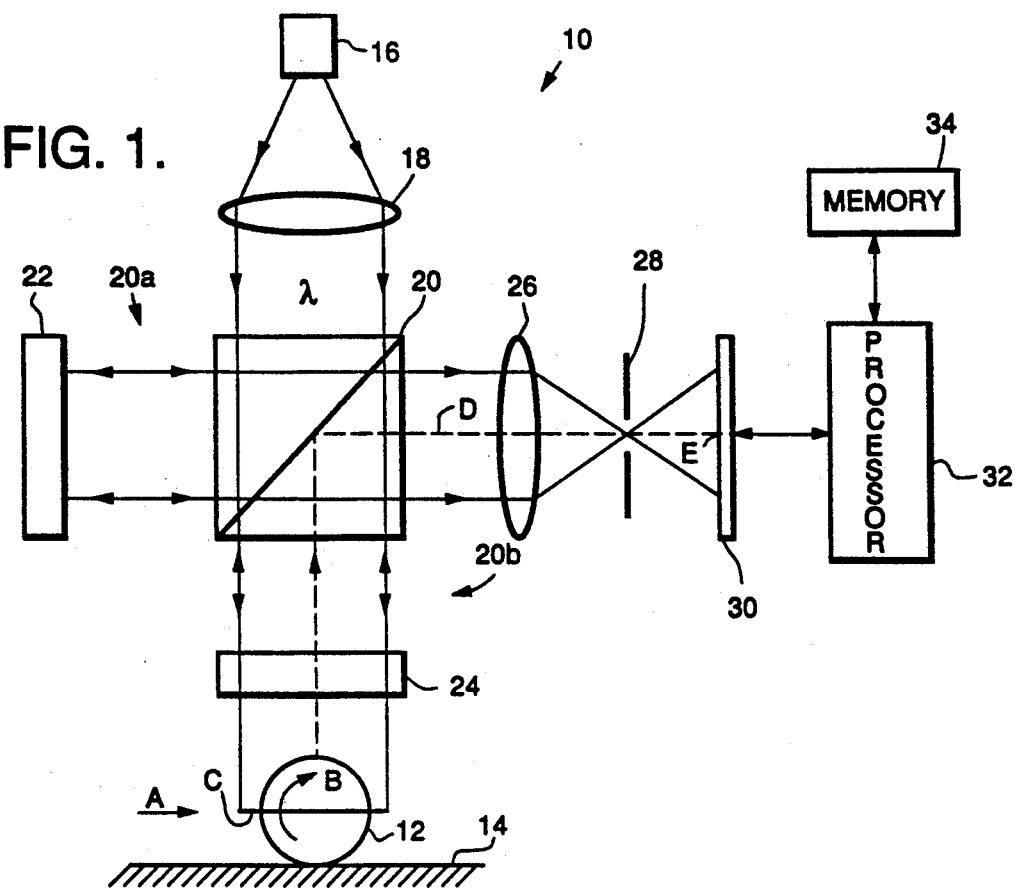
FIG. 1 is a schematic depiction of a ball bearing test station constructed and operated in accordance with a first embodiment of the invention to employ single wavelength interferometry.

Referring to FIG. 1 there is illustrated a first embodiment of a ball bearing roundness test station 10. During operation, a ball bearing 12 rolls across a flat surface 14. The surface 14 may be an optical flat or a pair of rails made mechanically smooth. The direction of motion of the ball bearing 12 is indicated by the arrow A while the rotation of the ball bearing 12 is indicated by the arrow B.

As employed herein the term "roundness" is intended to describe a characteristic of a surface of an object having, ideally, a constant radius of curvature. Any deviation from a constant radius causes the surface of the object to deviate from an intended or desired degree of roundness. By example, a deviation from a desired roundness may be the result of the object being improperly fabricated with a variable radius, or may result from a surface defect, such as a dent. Thus, although the invention is described in the context of a test station for ball bearings it should be kept in mind that the teaching of the invention is applicable to the testing of spherical or circular cylindrical objects in general.

The test station 10 includes an optical source 16 having a single significant wavelength output. A laser diode operating at approximately 785 nanometers is one suitable embodiment for the source 16. A collimating lens 18 receives the output of the source 16 and collimates same for application to an interferometer.

The interferometer includes a non-polarizing beamsplitter 20 that provides a reference beam 20a and a measurement beam 20b. A mirror 22 is disposed in a reference arm of the interferometer for reflecting the reference beam 20a back towards the beamsplitter 20. A measurement leg of the interferometer includes a cylindrical lens 24 that provides a linear, stripe-like measurement beam having a locus of focus points indicated by the letter C. The cylindrical lens 24 forms the measurement beam into a linear pattern that intersects the geometric center of the ball bearing 12. An imaginary line traced out by the center of the ball bearing 12, as it rolls, coincides with the linear pattern at the focus of the cylindrical lens. The mirror 22 is positioned such that the optical path length of the reference beam 20a is equal to the optical path length of the measurement beam 20b, as referenced to the locus of focus points C.

When the ball bearing 12 rolls through the locus of focus points C the measurement beam reflects from the surface of the ball bearing 12 back towards the beamsplitter 20. A combined measurement beam and object beam are provided to a focussing lens 26 that has a focal point coincident with a slit aperture of a spatial filter 28. An imaging device, such as a CCD imager 30, is disposed behind the spatial filter 28 and receives the reflected reference beam 20a and the reflected measurement beam 20b. The stripe of radiation reflected back from the surface of the ball bearing 12, represented by the dashed line D, forms a linear image E on the imaging surface 30a of the CCD imager 30.

As the ball bearing 12 rolls it generates a flat, two-dimensional interferogram on the imaging surface 30a of the CCD imager 30. This interferogram is recorded by a data processor 32 that is coupled to an output of the CCD imager 30. The data processor 32 compares the recorded interferogram to an interferogram stored in a memory 34. The interferogram stored in the memory 34 is that obtained from a reference ball bearing having a roundness within an acceptable tolerance level. The amount of deviation between the two interferograms is indicative of a deviation of the roundness of the ball bearing 12 from that of the reference ball bearing. Data processor 32 searches for the dark fringes in the interferograms and determines the locations of the dark fringes in two-dimensional coordinates. If the two interferograms are determined by the processor 32 to deviate by more than some predetermined amount, the ball bearing 12 is determined to have a roundness outside of an acceptable tolerance.

In greater detail, the linear image E projected onto the CCD imager 30 is perpendicular to the plane of the drawing. The linear image E has, at each instant, interference information characteristic of a portion of a meridian on the illuminated portion of the ball bearing 12.

As the ball bearing 12 rolls through the locus of focus points C, the linear image E moves across the imaging surface 30a of the CCD imager 30 in a bottom-to-top fashion. An inherent persistence of the CCD imager 30 momentarily stores a 2-dimensional interferogram corresponding to a relatively large arc of the ball bearing 12. That is, due to the rolling motion of the ball bearing 12 the substantially one-dimensional linear image E is swept across the CCD imager 30 to form a two-dimensional interferogram. This interferogram results from changes in the optical path length of the measurement leg relative to the reference leg, the changes in optical path length being due to the presence of the surface of the ball bearing 12.

The desired velocity of the rolling ball bearing 12 is a function of several parameters. These include the radius of the ball bearing 12 and the persistence of the selected CCD imager 30. A typical persistence for commercially available CCD imagers is within a range of approximately 0.05 seconds to approximately one second, and is related to the illumination intensity. Preferably, the velocity of the rolling ball bearing is such that the generated two-dimensional interferogram represents a significant portion of the surface area of the ball bearing 12, while scanning the linear image E across the surface 30a of the imager 30 within a time that is less than the persistence time of the selected CCD. Ideally, the ball bearing 12 makes one complete revolution as it passes through the locus of focus points C. The CCD imager 30 may be read out several times to obtain the complete interferogram, or may be read out once at the end of the transit of the ball bearing through the test station. Measurement accuracies of 0.01 micrometers are obtainable with the roundness tester of the invention.

Figure 2:
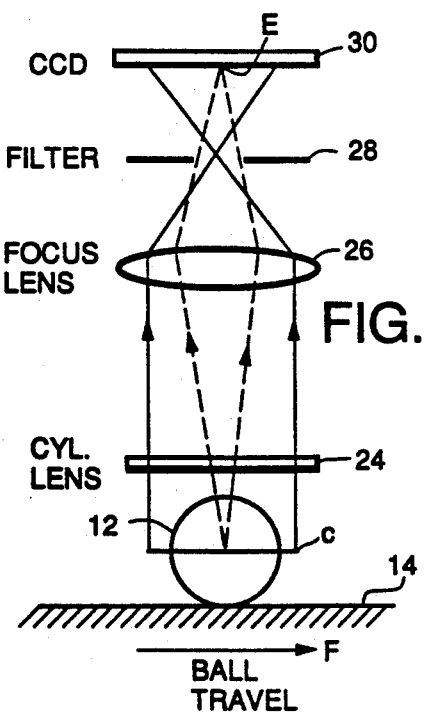
FIG. 2 depicts the optical apparatus of FIG. 1 in an un-folded configuration, the view being taken perpendicular to a path of a ball bearing passing through a focal point of the apparatus.
Figure 3:
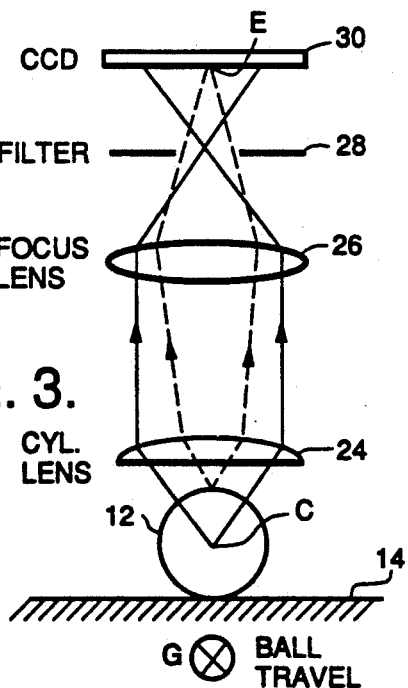
FIG. 3 depicts the optical apparatus of FIG. 1 in an un-folded configuration, the view being taken colinear with the path of the ball bearing passing through the focal point of the apparatus.

FIGS. 2 and 3 each show a view of the optical imaging geometry of FIG. 1 in an unfolded configuration. In FIGS. 2 and 3, elements that correspond to elements in FIG. 1 are numbered the same. In FIG. 2 the ball bearing 12 travel is, as depicted by the arrow F, parallel to the plane of the drawing whereas in FIG. 3 the arrow G indicates that the ball bearing 12 travel is perpendicular and into the plane of the drawing.

Figure 4:
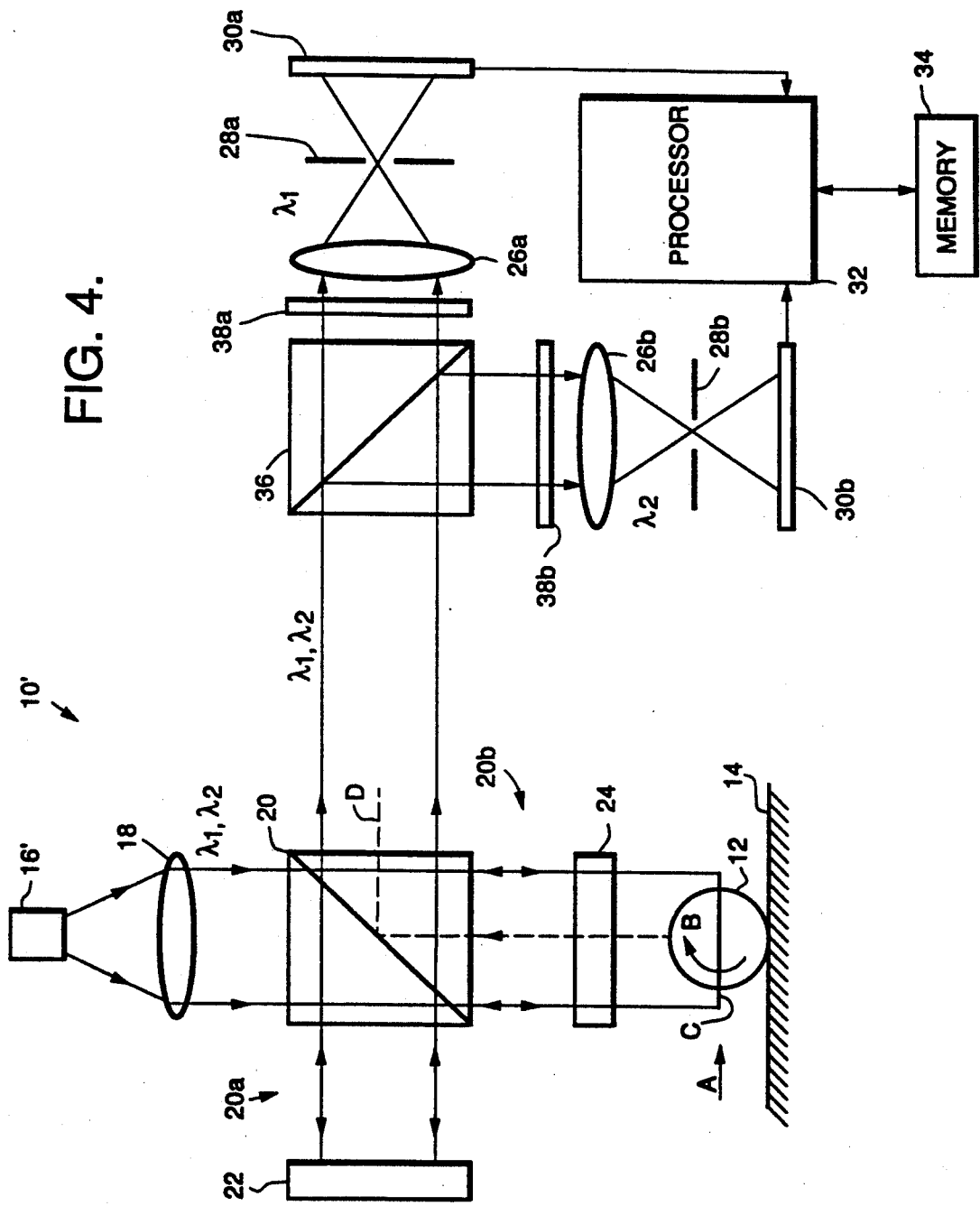
FIG. 4 is a schematic depiction of a ball bearing test station constructed and operated in accordance with a second embodiment of the invention to employ two-wavelength interferometry.

FIG. 4 depicts a second embodiment of a test station 10' that employs two-wavelength interferometry. In FIG. 4 elements having reference numbers the same as the embodiment of FIG. 1 operate in the same fashion. Differences between these embodiments include a dual wavelength optical source 16' comprised of, by example two single mode laser diodes or a single, multi-mode laser diode. A source generating significant two optical wavelengths in the vicinity of 785 nanometers is one suitable embodiment. The test station 10' includes an additional non-polarizing beamsplitter 36 that provides two beams to a dual measurement channel. A first channel includes an interference filter 38a that preferentially passes one of the two source wavelengths. This first portion of the combined measurement beam and object beam is provided to a focussing lens 26a that has a focal point coincident with a slit aperture of a spatial filter 28a. An imaging device, such as a CCD imager 30a, is disposed behind the spatial filter 28a and receives the first portion of the reflected reference beam 20a and the reflected measurement beam 20b. A second measurement channel includes an interference filter 38b that preferentially passes the other one of the two source wavelengths. This second portion of the combined measurement beam and object beam is provided to a focussing lens 26b having a focal point coincident with a slit aperture of a spatial filter 28b. A second CCD imaging device 30b is disposed behind the spatial filter 28b and receives the second portion of the reflected reference beam 20a and the reflected measurement beam 20b. The processor 32 is coupled to both imagers and receives interferograms from each. An equivalent phase is computed as in the above referenced U.S. Pat. No. 4,832,489.

A suitable separation for the two wavelengths is approximately 30 nanometers to achieve high accuracy measurements. The exact separation between wavelengths is a function of the required measurement accuracy.

Although not shown in FIGS. 1 and 4, it should be realized that a large number of ball bearings 12 may be individually fed from a container such that each rolls through the test station 10. Furthermore, apparatus may be included for triggering the operation of the processor 32 to obtain the 2-dimensional interferogram from the CCD imager 30. By example, a Hall-effect device can be mounted for detecting the presence of the ball bearing 12 as it enters the locus of focus points C. Similarly, a light beam transmitter and receiver can be so disposed such that the ball bearing 12 interrupts the beam as it enters the locus of focus points C, the beam remaining interrupted until the ball bearing exits this region. It is also within the scope of the invention to provide a diverting apparatus, operating under the control of the processor 32, for diverting from a normal path of travel any ball bearing determined to have an unacceptable roundness.

As such, it can readily be seen that the test stations 10 and 10' may be integrated with a production line facility so as to obtain, in a rapid manner, a precise indication as to whether a roundness of a ball bearing under test is within a predetermined acceptable roundness tolerance.

While the invention has been particularly shown and described with respect to a preferred embodiment thereof, it will be understood by those skilled in the art that changes in form and details may be made therein without departing from the scope and spirit of the invention.

What is claimed is:

1. Apparatus for determining if a spherical surface of an object has a radius of curvature within a predetermined tolerance, comprising:

interferometer means including a reference beam and a single measurement beam, the measurement beam being disposed for illuminating a portion of a surface of the object with a substantially linear radiation pattern while the object is in rolling motion, the measurement beam reflecting from the surface of the object;

means, optically coupled to an output of the interferometer means, for recording at least one interferogram that results from a change in an optical path length of the measurement beam relative to an optical path length of the reference beam, the change in optical path length being due to the rolling motion of the object; and means, coupled to an output of the recording means, for comparing the interferogram recorded by the recording means to a reference interferogram previously recorded from a surface of an object known to have a radius of curvature within the predetermined tolerance.

2. Apparatus as set forth in claim 1 wherein the interferometer means includes:

optical source means; and beamsplitter means disposed for receiving an output of the optical source means for generating the reference beam and the measurement beam therefrom.

3. Apparatus as set forth in claim 2 wherein the optical source means includes an optical source having a single significant wavelength output.

4. Apparatus as set forth in claim 2 wherein the optical source means includes an optical source having a plurality of significant wavelength outputs.

5. Apparatus as set forth in claim 1 wherein the recording means includes a CCD imager.

6. Apparatus as set forth in claim 1 wherein the interferometer means includes means for forming the measurement beam into a substantially linear radiation pattern for illuminating the surface of the object.

7. Apparatus as set forth in claim 6 wherein forming means includes a cylindrical lens.

8. Apparatus as set forth in claim 1 wherein the interferometer means includes means, disposed between the output of the interferometer means and the recording means, for causing the reflected measurement beam to scan across a radiation sensitive surface of the recording means.

9. Apparatus for determining if a roundness of a spherical object is within a predetermined tolerance, comprising:

interferometer means including a reference beam and a measurement beam, the measurement beam being disposed for illuminating a surface of a spherical object while the spherical object is in rolling motion relative to the interferometer means, the interferometer means including means for forming the measurement beam into a substantially linear radiation pattern for illuminating the surface of the spherical object, the measurement beam reflecting from the surface;

means, optically coupled to an output of the interferometer means, for recording at least one interferogram that results from a change in an optical path length of the measurement beam relative to an optical path length of the reference beam, the change in optical path length being due to the movement of the surface of the spherical object;

means, coupled to an output of the recording means, for comparing the interferogram recorded by the recording means to a reference interferogram previously recorded from a surface of a reference spherical object known to have a radius of curvature within the predetermined tolerance.

10. Apparatus as set forth in claim 9 wherein the interferometer means includes:

optical source means; and beamsplitter means disposed for receiving an output of the optical source means for generating the reference beam and the measurement beam therefrom.

11. Apparatus as set forth in claim 10 wherein the optical source means includes an optical source having a single significant wavelength output.

12. Apparatus as set forth in claim 10 wherein the optical source means includes an optical source having a plurality of significant wavelength outputs.

13. Apparatus as set forth in claim 9 wherein the recording means includes a CCD imager.

14. Apparatus as set forth in claim 9 wherein the interferometer means includes means disposed between the output of the interferometer means and the recording means for causing the reflected measurement beam to scan across a radiation sensitive surface of the recording means.

15. Apparatus as set forth in claim 9 wherein forming means includes a cylindrical lens.

16. A method of testing a spherical surface of an object to determine if the surface has a radius of curvature within a predetermined tolerance, comprising the steps of:

while rotating the surface, illuminating the rotating surface with a measurement beam of optical radiation for forming a linear radiation pattern upon the rotating surface;

combining a reference beam of optical radiation with a portion of the measurement beam that reflects from the surface;

projecting the combined measurement beam and reference beam upon a means for recording at least one interferogram that results from a difference in optical path length between the reference beam and the measurement beam, the difference in optical path length being due to the presence of the surface within the measurement beam; and comparing the at least one recorded interferogram to an interferogram previously obtained from a surface of an object known to have a radius of curvature within the predetermined tolerance.

17. A method as set forth in claim 16 wherein the step of illuminating includes a step of forming the measurement beam into a linear pattern of radiation by passing the measurement beam through a cylindrical lens.

18. A method as set forth in claim 16 wherein the step of combining includes a step of providing the reflected measurement beam and a reflected reference beam to a beam splitter.

19. A method as set forth in claim 16 wherein the step of projecting includes a step of scanning a substantially one dimensional interferogram across a radiation sensitive surface so as to form a two dimensional interferogram.

20. A method as set forth in claim 16 wherein the step of illuminating forms the measurement beam into a linear pattern having a focal point that intersects the geometric center of the ball bearing.

* * * * *